INVENTOR.
Regner A. Ekstrom, Jr.

Feb. 2, 1954    R. A. EKSTROM, JR    2,667,941
UNITARY HEAT EXCHANGE AND PARTICLE COLLECTING
APPARATUS FOR COMBUSTION GASES
Filed Feb. 24, 1951    10 Sheets-Sheet 5

INVENTOR.
Regner O. Ekstrom, Jr.
BY
Glenn S. Noble
Atty.

Feb. 2, 1954    R. A. EKSTROM, JR    2,667,941
UNITARY HEAT EXCHANGE AND PARTICLE COLLECTING
APPARATUS FOR COMBUSTION GASES
Filed Feb. 24, 1951    10 Sheets-Sheet 9

INVENTOR.
Regner A. Ekstrom, Jr.
BY
Glenn S. Noble
Atty.

INVENTOR.
Regner A. Ekstrom, Jr.
BY
Glenn S. Noble
atty.

Patented Feb. 2, 1954

2,667,941

UNITED STATES PATENT OFFICE 2,667,941

UNITARY HEAT EXCHANGE AND PARTICLE COLLECTING APPARATUS FOR COMBUSTION GASES

Regner A. Ekstrom, Jr., Harvey, Ill.

Application February 24, 1951, Serial No. 212,625

6 Claims. (Cl. 183—7)

This invention relates to furnaces and particularly those furnaces known as "Cupolas" and will be described with relation thereto; and also relates to means for utilizing the heat of the gases of combustion and removing materials such as dust, fumes, smoke and ash or gases therefrom.

The objects of the invention are to provide an improved furnace or cupola; to provide an improved means for treating the gases of combustion of cupolas or the like; to provide means for more perfect furnace combustion and more efficient operation; to provide means for utilizing the heat from the discharge gases to heat the air supply to the cupola; to provide for cooling the gas and then removing the dust, smoke or other material therefrom by means of a suitable precipitator or separator; to provide a cupola with a closed combustion chamber and an auxiliary combustion chamber with cooling and washing means and using the heat from the discharge gases to heat the air for supplying the cupola; to provide a cupola with means for cooling the discharge gases and with an electronic precipitator or other form of dust collector; to provide means for preventing air polution from furnaces; and to provide such other objects and advantages as will appear more fully hereinafter.

In the accompanying drawings illustrating this invention.

Figure 1:
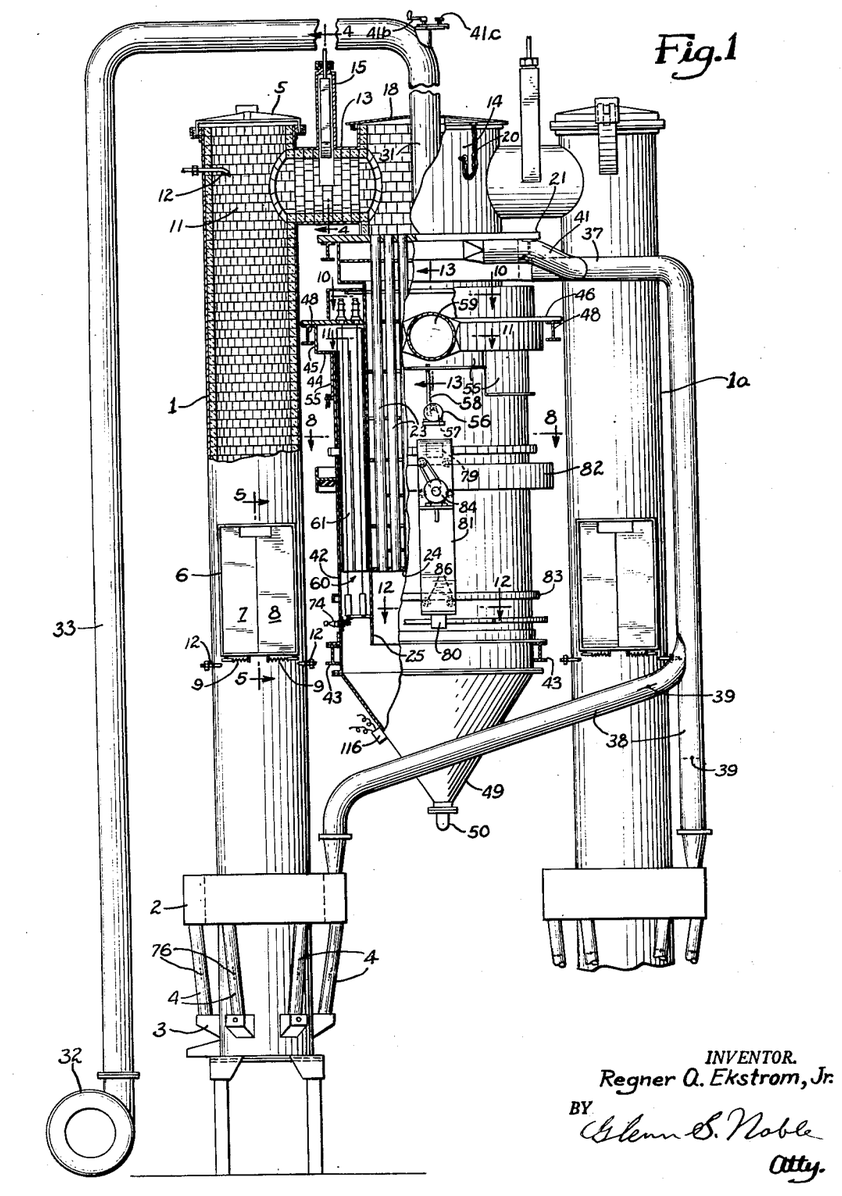
Fig. 1 is a side view of my improved apparatus with parts broken away to show the interior construction.
Figure 2:
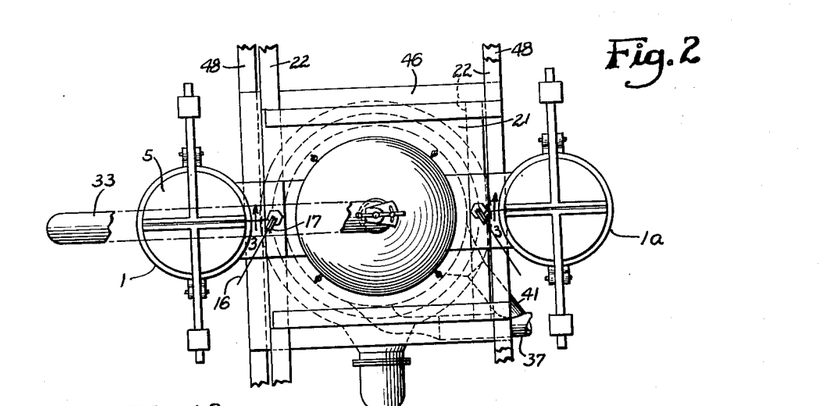
Fig. 2 is a top plan view of the apparatus shown in Fig. 1 also with parts broken away or omitted for convenience in illustration.

The furnace 1 as shown in these drawings may represent any apparatus in which fuel is burned to produce heat or power or for other purposes, but is particularly intended to illustrate a foundry cupola for melting iron. My improvements may be applied to a single cupola or to a plurality of cupolas, two of which 1 and 1a are shown in Fig. 1 as connected to a common discharge gas treating apparatus. However, as these cupolas are duplicates, it will only be necessary to describe one of them. This cupola has the usual wind box 2 which may be connected to the tuyères 3 by downcomer pipes 4 and is also provided with the usual discharge outlet common to such cupolas. However, one of the important features of the invention consists in providing a cap or cover 5 for the cupola which will prevent discharge of gases under ordinary conditions, but is hinged so that it will be raised in case of an explosion, and preferably has a shot seal around the edge.

Figures 3, 4, 5, 6, 7:
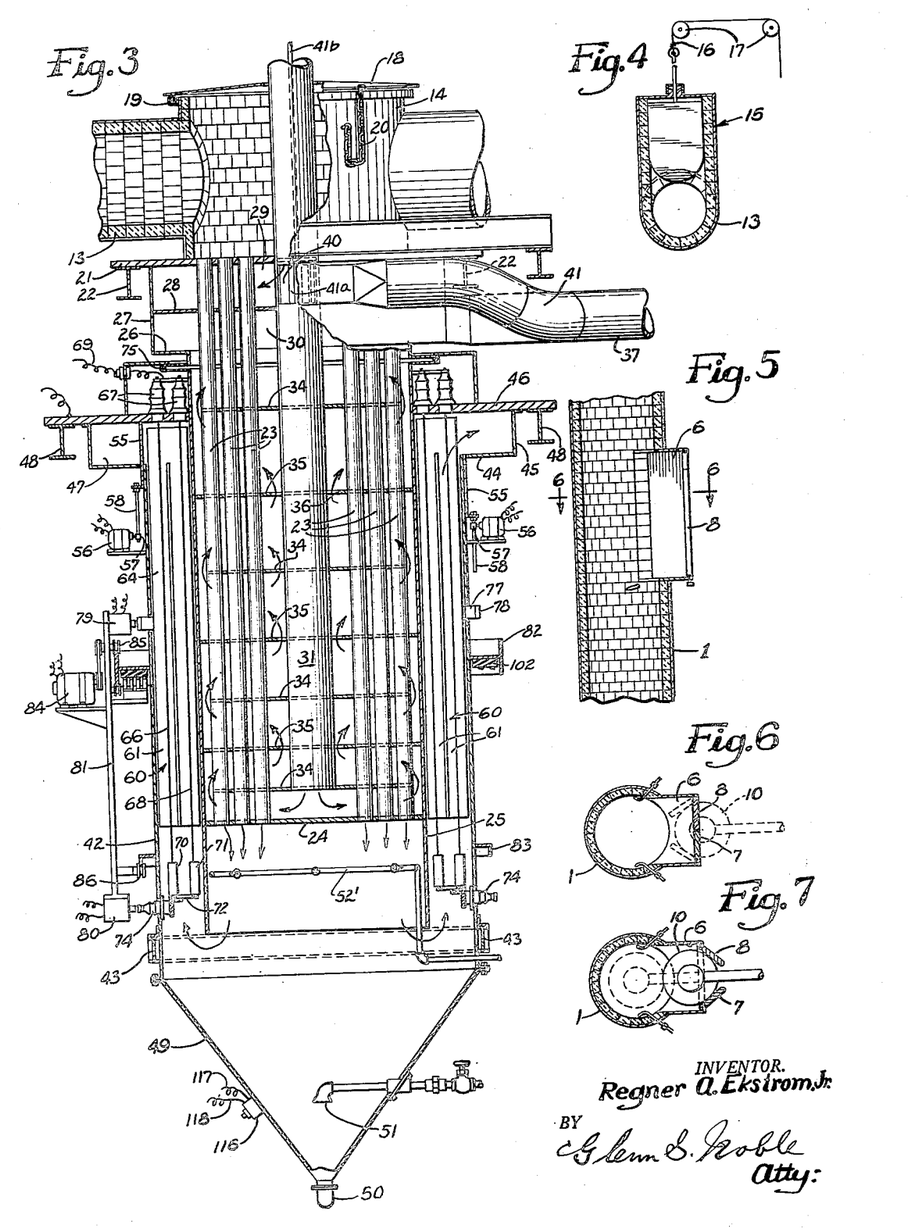
Fig. 3 is a vertical sectional view of the device for cooling the exhaust gases, heating the air supply for the cupola and electrical precipitator.
Fig. 4 is a sectional detail taken substantially on the line 4—4 of Fig. 1.
Fig. 5 is a sectional detail taken on the line 5—5 of Fig. 1.
Fig. 6 is a section taken on the line 6—6 of Fig. 5.
Fig. 7 is a view similar to Fig. 6 with the doors shown in changing position.
Figures 8, 9:
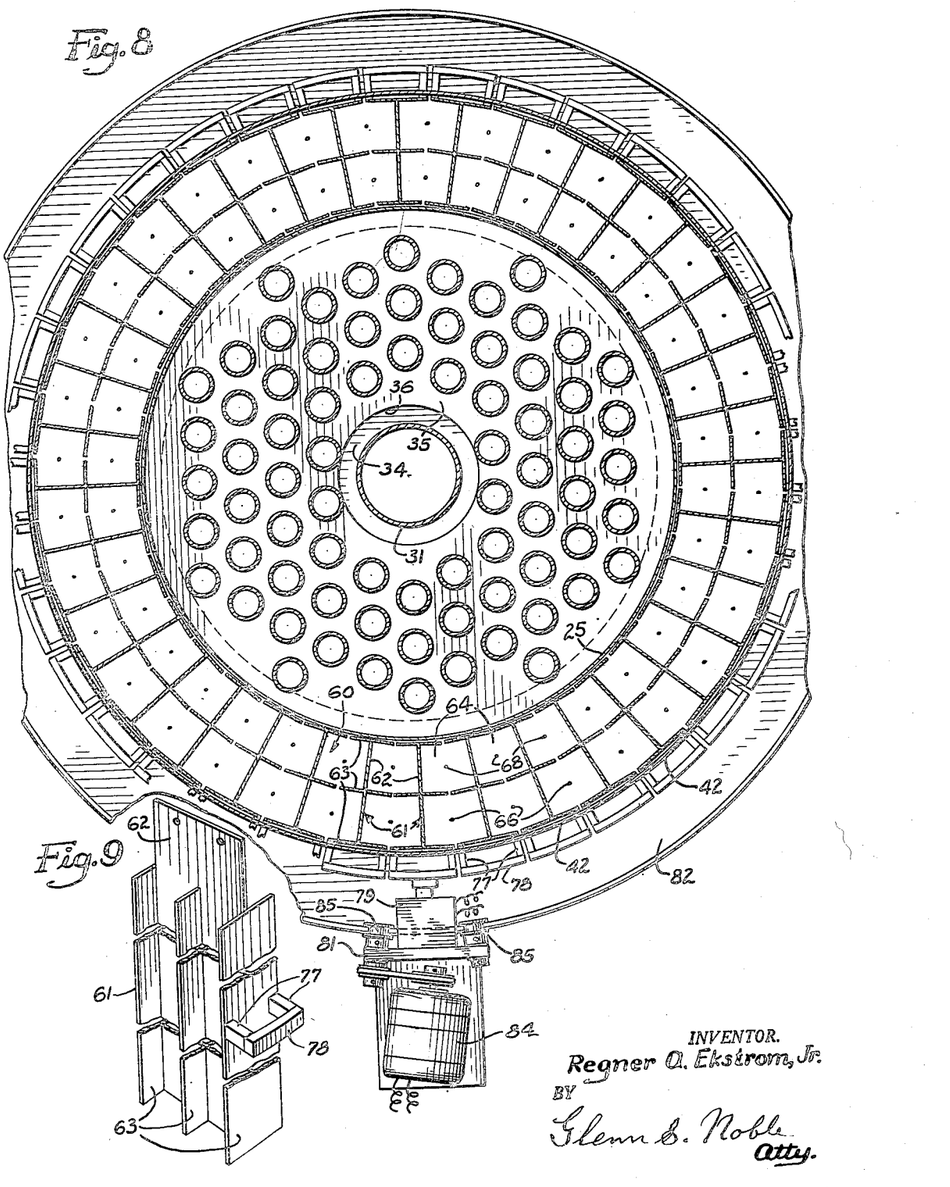
Fig. 8 is an enlarged horizontal sectional view taken substantially on the line 8—8 of Fig. 1.
Fig. 9 is a perspective view of the collecting plates of the electrical precipitator.

The charging opening 6 is controlled by doors 7 and 8 which are particularly shown in Figs. 5, 6 and 7. These doors are mounted on vertical pivots or hinges and may be urged to closing position by means of springs 9 or gravity. They are adapted to swing inwardly when the charging bucket 10 enters the opening as shown in Fig. 6 and will be swung outwardly by the bucket when it is withdrawn as shown in Fig. 8. These doors prevent undue amounts of atmospheric air to enter the combustion area of the cupola.

The closing of the top of the cupola or stack 1 forms a combustion chamber 11 in the top of the stack for more complete combustion of the fuel. This chamber is provided with one or more lighters or ignition devices 12 to insure continued combustion at the top of the chamber. These may be either gas pilot lights or electric igniters which may be supplied and operated in any well known manner.

The combustion chamber 11 is connected by a pipe or conduit 13 with the top of a drum 14 best shown in Fig. 3. This pipe or connection is controlled by a valve 15 which may be of any suitable type, but preferably comprises the gate valve as shown in Fig. 4 which may be actuated by a cable 16 running over guide sheaves 17 to any convenient point for manual operation.

The drum 14 has a cap or cover 18 having a suitable seal 19 which will prevent escape of gases but will permit the cover to be raised in the event of an explosion. Safety chains 20 connect the cover with the drum to prevent its being blown away or raised beyond the predetermined distance. The drum 14 is closed at the bottom by a disc or plate 21 which extends outwardly and is supported by beams 22 which may form a part of the enclosing structure (not shown) or which may be supported on posts.

The disc 21 also forms a header for a plurality of downwardly extending tubes 23, the lower ends of which are connected with a second disc or header 24 (see Fig. 3) which is connected with and forms a partition adjacent to the bottom of a shell or cylinder 25 which is connected at the top with an annular plate ring 26 which extends outwardly and is connected with the bottom of a short cylinder 27 the upper end of which is connected with the plate 21. This short cylinder is divided into two sections by a central disc 28 which has holes therethrough for the tubes 23. This provides an upper air chamber 29 and a lower chamber 30 which forms an extension on the cylinder 25.

An air pipe 31 extends down through the heat exchange apparatus as shown in Fig. 3 and is supplied with atmospheric air from a fan or blower 32 through pipe 33 as shown in Fig. 1. The pipe 31 extends through a series of baffle plates or discs 34 and 35 which are spaced apart with increasing spaces as shown. The discs 34 fit closely around the pipe 31 and terminate at a short distance from the inner wall of the cylinder 25, and all the baffle plates are provided with holes for the tubes 23 as shown. The baffle plates 35 fit closely in the cylinder 25 and have annular openings 36 around the pipe 31. The pipe 31 fits in the lowermost baffle plate 34 which is positioned a short distance above the head 24, thus leaving a space for air to pass down and out from the pipe. The air then passes up through the tortuous passageway as indicated by the arrows and enters the lower chamber 30 which is connected by a pipe 37 with the wind box 2 of the cupola, and where a plurality of cupolas are used, this pipe is connected to the wind boxes of the several cupolas in order to furnish air thereto when desired. Branches 38 may be provided for this purpose, and suitable valves 39 arranged for controlling the air supply. Only one of the cupolas will be operated at a time so that all of the air from the fan 32 will pass to the cupola then in operation.

The airpipe 31 has slots 40 leading into the upper chamber 29 so that a limited amount of air may pass from the pipe through the chamber which is connected to pipe 37 by a connecting pipe 41, these slots being controlled by a rotary damper 41a actuated by a rod and crank 41b and locked by a pin 41c.

I provide the novel form of electric precipitator which is connected with and coacts with the heat transfer apparatus. For this purpose, a cylinder or shell 42 is mounted concentric with the cylinder 25 and may be supported by means of eye beams 43 forming a part of the framing of the building or in any other suitable manner. The upper end of the shell 42 is connected with an annular plate or ring 44 which extends outwardly and is in turn connected with a short cylinder 45 which is closed at the top by a plate 46 which fits around and is connected to the cylinder 25, thus forming an annular gas chamber 47. The plate 46 may be supported by beams 48 or in any other suitable manner. The lower end of the shell 42 is closed by a conical ash receiving member 49 which is secured thereto by bolts and which has an outlet valve 50 at the lower end. A water spray 51 provides means for washing out the discharge, if necessary. An annular water spray 52' is positioned in the cylinder 25 shortly below the lower head 24 and serves to assist in cooling and humidifying the gases of combustion as will presently be explained.

Figures 10, 11, 12, 13, 14, 15, 28:
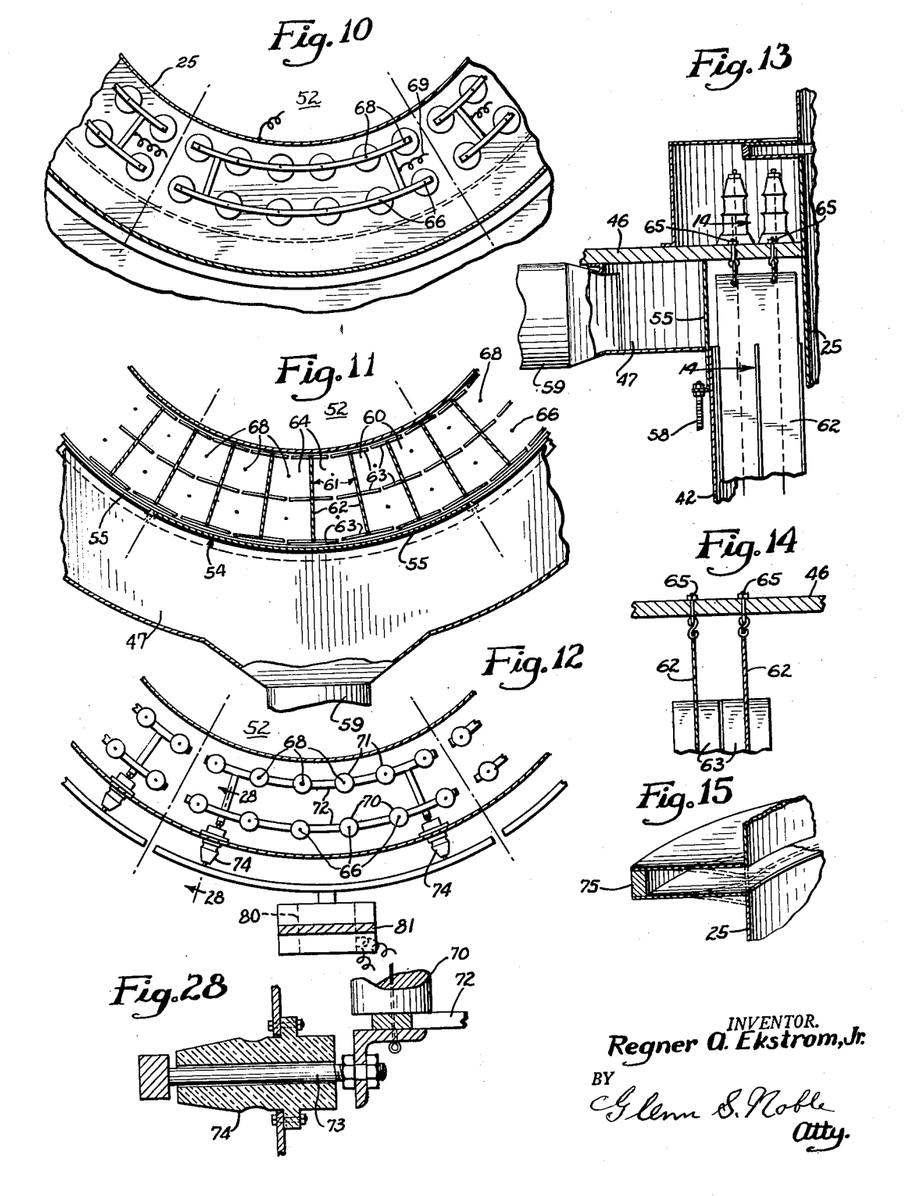
Fig. 10 is an enlarged sectional view taken on the line 10—10 of Fig. 1 showing the grouping of the electric wires in the sections of the precipitator.
Fig. 11 is an enlarged sectional view taken on the line 11—11 of Fig. 1.
Fig. 12 is a similar sectional detail taken on the line 12—12 of Fig. 1.
Fig. 13 is an enlarged sectional view taken on the line 13—13 of Fig. 1.
Fig. 14 is a section taken on the line 14—14 of Fig. 13 showing the means for suspending the precipitating plates.
Fig. 15 is a detail of an expansion joint in one of the shells.

The gas chamber 47 is divided into a plurality of sections 52 preferably six as shown in Figs. 10, 11 and 12. The inner walls of these sections are formed by the upper end of the shell 42 and openings 54 are provided for each section. These openings are closed at times by means of vertically movable gates 55. The gates are operated by means of motors 56 mounted on the shell 42 and provided with pinions 57 which coact with the racks 58 extending downwardly from the gates as shown particularly in Fig. 13. The arrangement is such that the outlet from each section may be closed when the collector plates in such section are being rapped. The gases of combustion pass from the gas chamber 47 through an outlet 59 leading to atmosphere. The space between the shell 42 and the cylinder 25 provides an annular electrical precipitator chamber 60 which is divided into sections corresponding to the sections of the gas chamber 47, the gates 55 controlling the openings from the gas chamber into the separator chamber.

The collecting plates 61 are of the novel form particularly shown in Figs. 9 and 11 and consist of flat radial bars 62 with outwardly projecting fins or flanges 63, the flanges being proportioned so that the bars and flanges of the adjacent plate members form vertical passageways 64. The central bars 62 extend upwardly beyond the flange members and are supported from the plate 46 by means of bolts 65, these bolts furnishing electrical connections to the plates. The collecting plates or electrodes extend down to approximately the level of the head 24.

One set of ionizing electrodes or wires 66 are mounted in the outer peripheral row of passageways 64 and coact with the adjacent plates 61. These wires extend up through the plate 46 and are supported by insulators 67. Another series of similar wires or electrodes 68 are mounted in the inner peripheral series of openings or passageways 64 and also coact with the adjacent plates. The upper ends of these wires are connected together and current is supplied thereto from any suitable source through wire 69. The lower ends of the wires 66 and 68 extend below the head 24 and are connected through insulators 70 and 71 with a ring 72 preferably of angular cross section. Rapping rods 73 are connected to the outer flange of the ring 72 and extend out through the shell 42 being insulated therefrom by insulators 74. It will be understood that the discharge electrodes or wires and the collecting electrodes or plates are properly proportioned and supplied with the right amount of high tension current in order to ionize the particles in the gases and cause them to collect on the plates as is usual with such electrical precipitators.

The cylindrical members or drums are preferably provided with expansion joints 75 as shown in Fig. 15 which will prevent undue strain incident to changes in the temperatures or heating of the respective members.

Where particularly accurate control of the combustion in the cupola is desired, the downcomer pipes 4 may be provided with automatically controlled gates 76 for regulating the tuyères air, the action of which will be readily understood.

It is necessary at times to rap the collector plates 61 in order to dislodge any material collected thereon.

The gases of combustion from the cupola 1 pass through the conduit 13 into the drum 14 and then down through the tubes 23 into the space at the bottom of the cylinder 25 below the partition 24, thence out at the open bottom of the cylinder 25 and up through the passageways 64. As the gases move up through these passageways, the particulate matter and any other ionizable contents of the gas will become ionized and collect on the plates. The gases then pass out through the peripheral openings 54 into the gas chamber 47 if the gates 55 are open, it being understood that these gates are alternately open and closed by the operating motors 56 and connected parts. The gases having been substantially cleaned or purified, then pass out to the atmosphere through the outlet 59.

In order to remove the collected material from the plates 61, each plate has lugs or projections 77 which extend out through the shell 42 and are connected by an arcuate bar 78. As shown in Fig. 8, these arcuate bars are arranged so that they come close together and make a substantially continuous ring around the periphery of the shell.

Any suitable means may be provided for rapping or tapping the plates in order to dislodge material collected thereon, but such means will be described in connection with the means for rapping or tapping of the electrode wire 66.

The tapping means or hammers may be either pneumatic or electrical. As shown at 79 and 80, they are electrically operated and may be of either the motor type or solenoids such as commonly used for this purpose. These hammers are mounted on a car or carriage 81 which travels on a circular track around the precipitator consisting of an upper rail 82 which is T-shaped in cross section, and a lower rail 83 of angular cross section as shown in Fig. 3. The carriage is actuated by a motor 84 having driving connections for turning the driving and supporting wheels 85, Fig. 8. The carriage also has lower guide wheels 86 which engage with the track rail 83. The arrangement is such that the upper hammer 79 engages with the bars 78 as it moves in a step by step movement around the precipitator. This movement is best illustrated by the wiring diagram Fig. 16 which also shows the operation of other electro-motive features of the apparatus.

Figure 16:
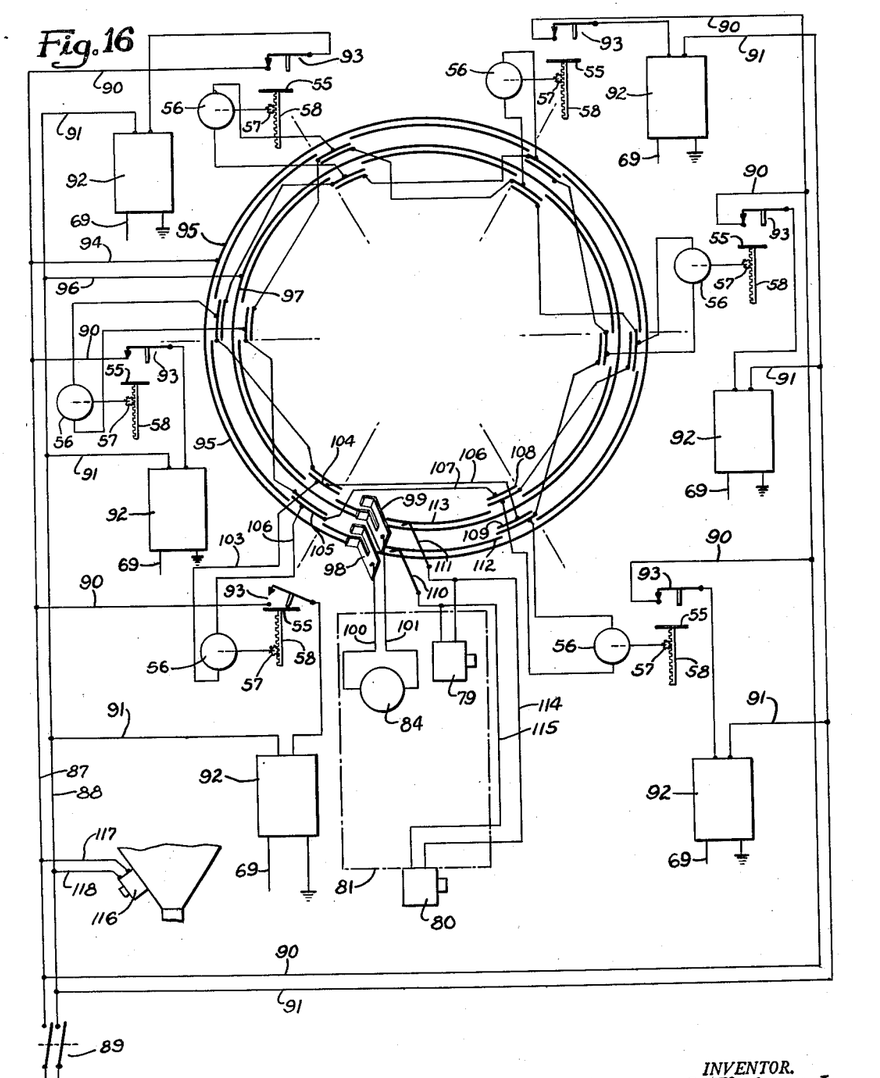
Fig. 16 is a wiring diagram to show the operations of the electric devices of the apparatus.

Supply wires 87 and 88 lead from any suitable source of supply as for instance one delivering 110 volts and the current of these wires is controlled by a switch 89. Branch wires 90 and 91 lead to the several transformers 92, all of which are adapted to supply the proper high tension current which may be from 15,000 to 100,000 volts or over depending upon the nature of the operation to be performed. The wires 90 are each provided with a switch 93, each of which is actuated by one of the respective gates 55, the arrangement being such that when the gate is up, such switch will be opened and current will be cut off from the transformer which supplies current to the ionizing electrodes 66 through wires 69 of the corresponding section with which such gate is connected.

A wire 94 leads from wire 87 to a contact supply ring 95. Wire 96 leads from wire 88 to a second contact supply ring 97. Current is supplied to the motor 84 from wires 95 and 97 through wipers or brushes 98 and 99 which are mounted on the car frame 81 and arranged to contact said supply wires. Wires 100 and 101 lead from the wipers to the terminals of the motor 84.

Figures 26, 27:
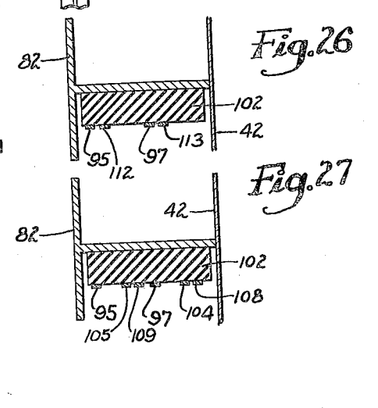
Fig. 26 is a sectional detail showing the supply wires and means for mounting the same.
Fig. 27 is a similar view showing the main wires and also sectional supply wires.

The supply rings 95 and 97 are carried on a circular insulating block 102 mounted on the rail 82 as shown particularly in Figs. 26 and 27. The block 102 also carries a plurality of segmental wires as shown in Fig. 16 for supplying current to various instrumentalities of the system.

The precipitation system is divided into six sections and the arrangement is such that the gases may be cut off of one section while the rappers or hammers are being actuated to remove the material from the plates in such section. As soon as the material is removed, the gate to the corresponding section is again closed and the current cut off from the hammers. During this period, current is also cut off from the electrode wires 66. The several circuits for supplying and cutting off the current for performing these operations are shown more particularly in Fig. 16.

The wipers 98 and 99 are each divided into two sections as shown, some of which make intermittent contact but one of the wipers is always in contact with the wire 95 and the other with the wire 97.

It will be noted that one of the switches 93 is shown as being open which is accomplished by the gate 55. Current for the motor 56 for such gate is supplied through wire 103 from a segmental contact ring member 104 and from a second contact ring member 105. When the bifurcated wipers 98 and 99 pass these segments, one of the wiper sections will make contact with the segment 105 and the other wiper segment will make contact with the segment 104, thus closing the circuit through the corresponding motor 56 and causing it to raise the gate 55 and open the switch 93. It will be noted that similar action takes place as the wipers move around the contact circles. The motor 56 is of the reversible type and when the wipers 98 and 99 reach the end of the adjacent section, they make contact with suitable segmental contact members and the main rings to reverse the current through the motor and close the gate. This is done by means of wires 106 and 107 which are connected with the contact members 104 and 105 respectively and with other contact members 108 and 109 adjacent to the end of the next section as will be seen from Fig. 16. As all of the transformers and motors of the several sections operate in the same manner, further description of the circuits does not appear necessary, but will be readily understood.

The car 81 also carries two wipers or contact shoes 110 and 111 which make contact with segmental supply wires 112 and 113 and supply current to the rappers 79 and 80 respectively through wires 114 and 115, the arrangement being such that the rappers are actuated only when the electric circuit is cut off from the transformers in the respective sections.

A vibrator 116 is supplied with electricity from the wires 87 and 88 through wires 117 and 118 such vibrator being preferably continuously actuated during the operation of the apparatus.

The operation of the apparatus will be understood from the above description, but particular attention is called to the provision of a combustion chamber at the top of the cupola instead of permitting the gases of combustion to pass directly into the air. As particularly shown in Fig. 1, the upper end of the cupola is formed into a combustion chamber 11 which leads directly into the conduit 13 and from thence into the drum 14 so that these connected areas all coact to provide for complete combustion of the combustible matter in the gases from the cupola. Such combustion is promoted by suitable gas jets or the like 12.

I have also found it desirable to cool the gases of combustion before attempting to separate the dirt therefrom. For this purpose, the gases are carried down through the tubes 23 and thence through the spray chamber and up through the electronic separation area and finally permitted to escape to atmosphere. At the same time, cold air is drawn through the pipe 31 and a controlled amount of such air is permitted to escape through the damper 49 which serves to cool the upper ends of the tubes and prevent undue burning or deterioration of the same. The rest of the air comes down as shown and comes up around the tubes and becomes heated and is joined by the air released through the damper and passes to the cupola through the pipe 37. This provides the tuyères with the air which is sufficiently heated to promote combustion and thus tends to economize the operation of the apparatus. The washing or spraying of the heated gases by means of the water spray 52 not only tends to cool the gases, but humidifies the same which assist in the operation of the electric precipitator.

When two cupolas are connected to a single separating unit as shown in Fig. 1, it will be understood that only one of such units will be operated at a time, thus giving opportunity to repair or take care of the other cupola.

Particular attention is also called to the novel collector plates which furnish large areas and provide for vertical chambers for the respective wires.

The temperature of the gases to be treated may vary greatly, but as an example, the ordinary temperature of the hot gas from a cupola will be approximately 1800° F. This is reduced in the heat exchanger to approximately 700° F. and again reduced by the water spray to approximately 350° F.

One of the important or fundamental features of my improved method consists in cooling the hot gases and preferably spraying the same, the air used in cooling being utilized for operating the cupola and then separating or precipitating the dust, smoke, or the like by any suitable means such as the electric precipitator above described or by means of strainers or filters or collecting bags. While the apparatus described makes a compact system for the purposes, it will be noted that the cooling means may be made separate from the dust separating means while still embodying the principles above enumerated.

Figure 20:
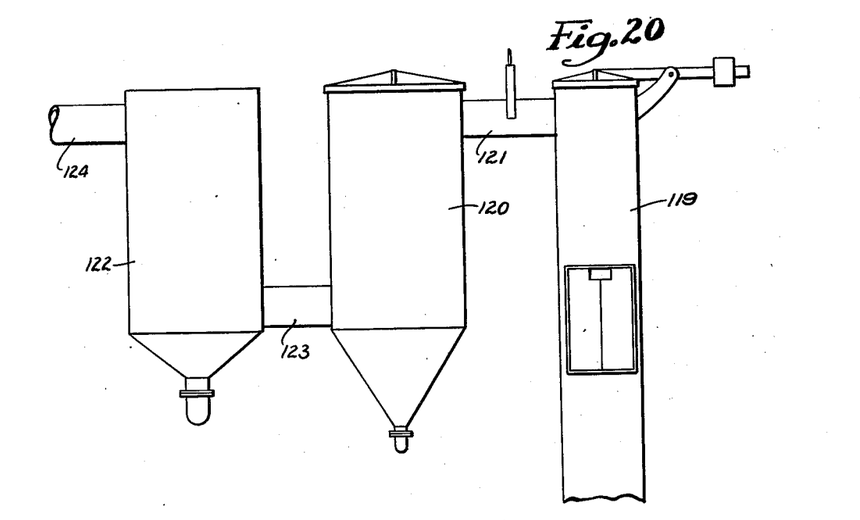
Fig. 20 is a diagrammatic view showing a further modification of the apparatus.
Figure 21:
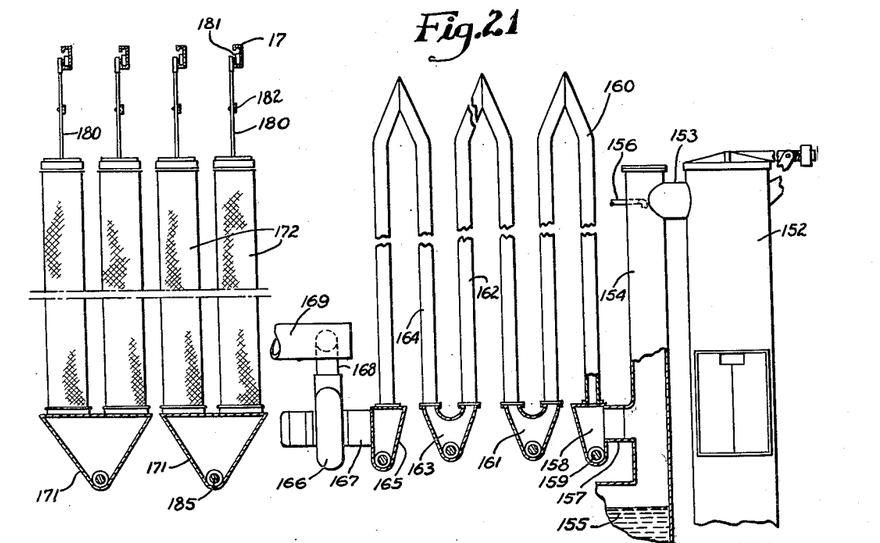
Fig. 21 is a further modification in which the gases of combustion are first cleaned and cooled and then passed through filter bags to atmosphere.
Figure 22:
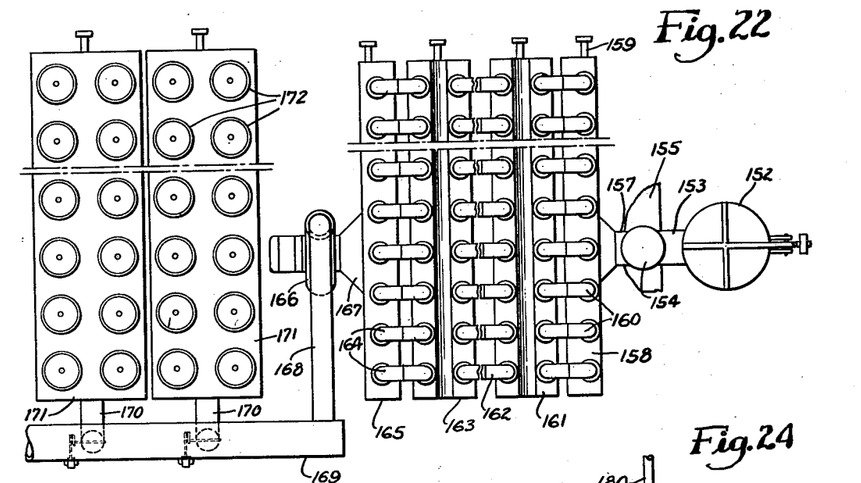
Fig. 22 is a plan view of Fig. 21.
Figure 23:
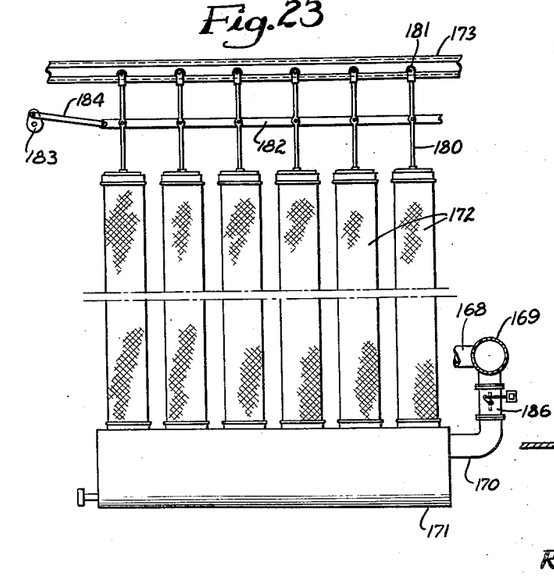
Fig. 23 is a side view of a group of separator bags showing the intake and also showing means for shaking the bags.

As illustrating schematically such a system, I have shown in Fig. 20 a cupola 119 which is connected to cooling means 120 by duct 121. The cooler is connected to a strainer or filter apparatus 122 by duct 123. The gases of combustion after being cooled and filtered are then discharged to atmosphere through pipe 124.

Figure 17:
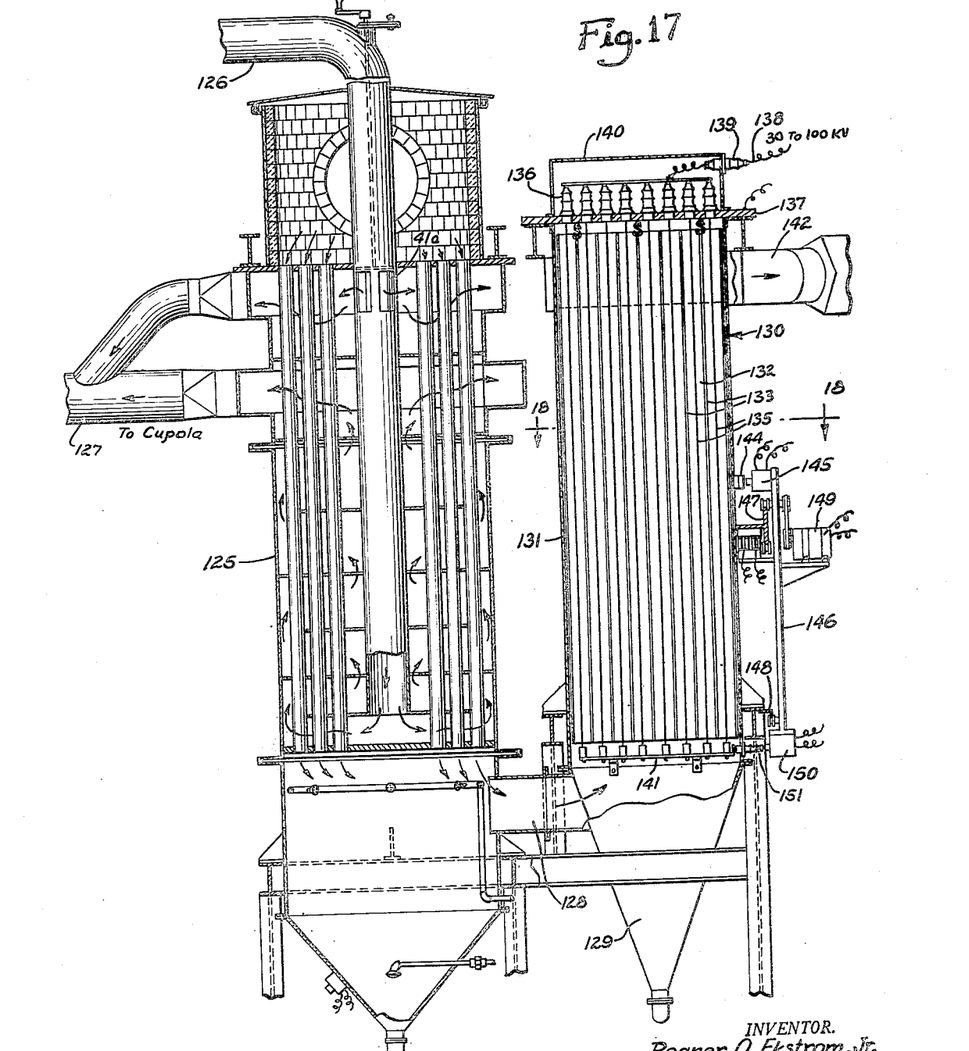
Fig. 17 is a vertical sectional view of a modification showing a gas cooling and air heating apparatus with a separately mounted electroprecipitator.
Figure 18:
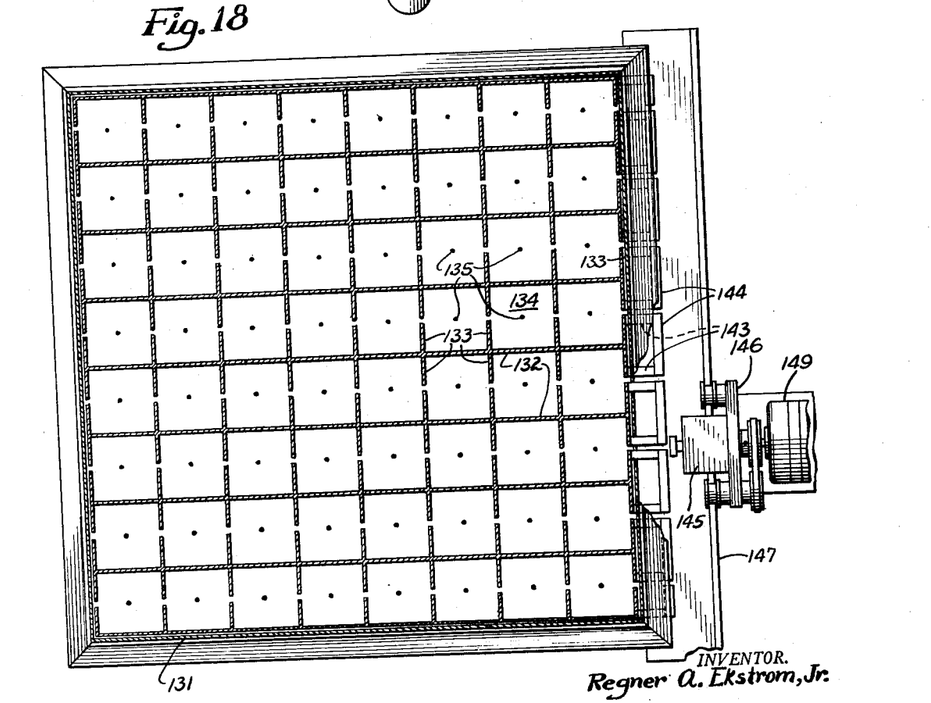
Fig. 18 is an enlarged section taken on the line 18—18 of Fig. 17.
Figure 19:
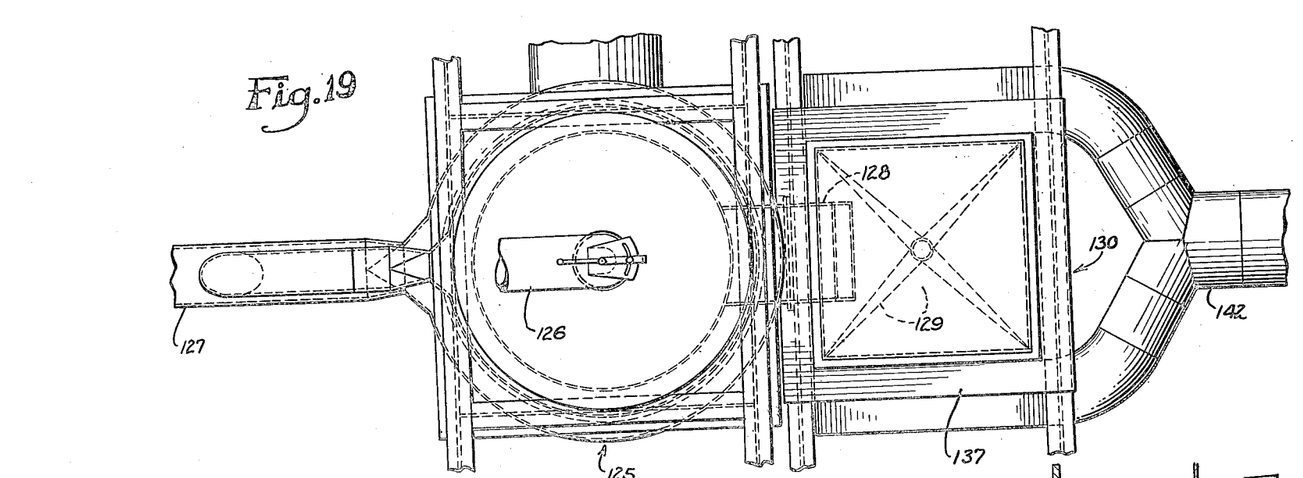
Fig. 19 is an enlarged plan view of the apparatus shown in Fig. 17.

This illustrates the basic principles above set forth without showing any particular details of construction. However, in Figs. 17, 18 and 19, I have shown the heat transfer apparatus 125 in detail, this being substantially the same as that heretofore described so that detail description is not necessary; however, it is noted that this apparatus provides means for cooling gases of combustion while heating the air which enters through the pipe 126 and passes to the cupola through pipe 127. In this instance, the gases of combustion pass through pipe 128 into the conical discharge section 129 of the electronic precipitator 130. In this case, the body or casing 131 is made rectangular as shown in Fig. 18. The collector plates 132 extend substantially across a casing and are provided with a plurality of fins 133 which are arranged so that the adjacent plates and the fins thereon form rectangular passageways 134 in which the high tension wires 135 are suspended. The collector plates are carried from supports at the top of the casing and terminate a short distance above the bottom as shown. The high tension wires 135 are carried by insulators 136 on a plate 137 at the top of the casing 131. These are all connected together and supplied with high tension current through wire 138 which passes through an insulator 139 in the hood 140 at the top of the casing. The lower ends of the wires are connected to a plate or plates 141. The discharge gases pass out from the top of the casing through pipe 142 to atmosphere.

As shown in Fig. 18, the fins or flanges 133 on the ends fo the plates are provided with lugs or projections 143 which extend out through the casing and are connected by bars 144 which bars are arranged in horizontal alignment with their ends close together and serve as hammer engaging means for jarring the collector plates. Any suitable means such as an electric hammer 145 may be used for this purpose. This hammer is shown as being mounted on a carriage 146 mounted on tracks 147 and 148 and driven by means of a motor drive 149. The carriage 146 also carries a second hammer 150 which coacts with rapping pins 151 on the wire connector 141. With this arrangement, the car is intended to be driven across the side of the stack and then reversed and the hammers actuated to engage with the coacting parts on the plates and wires.

Automatic control means may be provided for these operations but such means are not shown. It will be seen that with this apparatus, the cooled and humidified gases are passed into the electric precipitator which is particularly efficient in separating different materials such as dust or the like or fumes therefrom.

In Figs. 21 to 24, I have shown a modified form of apparatus which however, embodies the principle of first cooling and humidifying the gases of combustion as they come from the cupola and finally separating the dust therefrom. In this apparatus, the hot gases pass from the cupola 152 to connecting pipe 153 to a downcomer pipe 154 which leads to a settling tank 155. The water spray 156 is mounted in the pipe 154 preferably adjacent to the top thereof and serves to cool and humidify the gases passing through the pipe. Any dirt or dust which may be collected in the tank 155 may be drawn off or removed by any suitable means. The pipe 154 is connected by means of pipe 157 with a trough or V-shaped chamber 158 which is also provided at the lower extremity with outlet means 159 for removing dirt or the like. A series of U-shaped tubes 160 connect the chamber 158 with one side of a similar V-shaped connecting trough or chamber 161. The upper ends of the U-shaped pipes are preferably made with sharp connections to prevent collection of dust at the bends.

Figure 24:
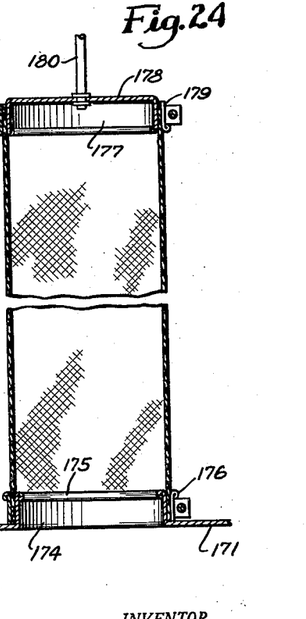
Fig. 24 is an enlarged sectional detail of one of the separator bags.
Figure 25:
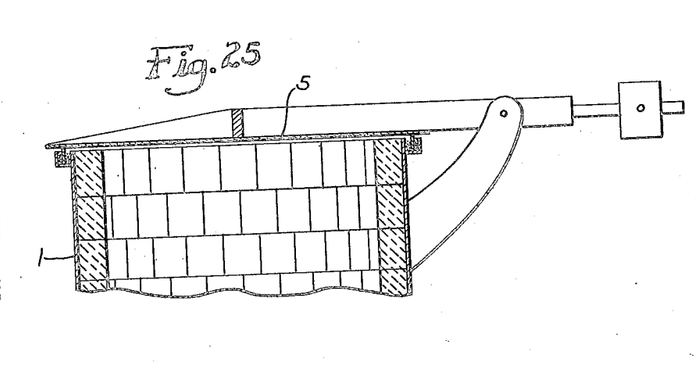
Fig. 25 is a fragmentary detail of the cupola cover 5 showing the means for supporting the same.

Another series of tubes 162 connect the chamber 161 with a similar chamber 163 which in turn is connected by tubes 164 with another chamber 165. This connected system of tubes and chambers provide a large area of cooling surfaces so that the gases are cooled by the air surrounding these parts. The gases are drawn through this system by a fan or pump 166 which is connected by pipe 167 with the last chamber 165. The gases are then driven through a system of collector bags or filters for performing the final cleaning operation. Any number of these bags may be used. In the present instance, the gases are driven through a pipe 168 to an enlarged pipe or drum 169. This drum is connected by means of pipes 170 with a series of V-shaped troughs or chambers 171 which supply gas to the bag filters 172. These filters comprise tubes of any desired diameter as from 6 to 30 inches and may be of any length as from 6 to 30 feet long. They are suspended from overhead tracks 173 and their lower open ends are fastened and connected to the gas inlet headers 171 as shown. The headers 171 have upwardly extending nipples 174 over which the lower ends of the bags are mounted as shown in Fig. 24. The nipples are provided with beads 175 to prevent cutting or injury to the bags which may be made of any suitable material but preferably of glass cloth commonly used for this purpose. The ends are held on the nipples by means of clamps 176, the upper ends of which are also beaded. The upper ends of the bags fit over flanges 177 on cup-shaped closures 178 and are held thereon by clamps 179. Hanger rods 180 are connected to the closures and are provided at their upper ends with wheels 181 which ride on the tracks 173. It is necessary to shake these bags occasionally to dislodge material collected therein. For this purpose, each series of bags has their hanger rods 180 connected by a longitudinal bar 182 which is reciprocated by means of a crank 183 and link 184 driven by any suitable source of power. The inlet headers 171 are provided with outlet openings or discharge means 185 for removing material discharged therein from the bags. A valve 186 provides means for shutting off gases from the bags when they are to be shaken.

In this form of the apparatus, the hot gases are humidified and are cooled by the heat exchange system which provides for air cooling so that the gases finally pass to the filter bags in a sufficiently cooled condition for the filtering action and without injury to the bags. It will be noted that the area of the passageways are gradually increased until the gas will have comparatively low velocity when passing through the bags and the clean air to the atmosphere.

It will be noted that changes may be made in the details of construction of my improved apparatus and in the arrangement of the parts to adapt the same for different purposes, and therefore I do not wish to be limited to the particular construction shown and described except as set forth in the following claims in which I claim:

1. A unitary heat exchange and particle collecting apparatus suitable for cooling and purifying the combustion gases from a cupola, which comprises, in combination, a drum having connected therewith a gas inlet duct, a cap having sealed relation with the top of the drum, a plate forming the bottom of the drum, a plurality of hot blast tubes extending downwardly from the plate, a header in which the lower ends of the tubes are fastened, a cylinder around the tubes and extending below the lower ends thereof, said header forming a partition in the cylinder, a shell around the cylinder forming an annular space therebetween, a discharge hopper for the shell, an outlet for the hopper, spray means below said header, an annular gas chamber around the top of the shell for receiving gas passing up through said space, an outlet from the gas chamber to atmosphere, electric precipitator means positioned in the annular space between the cylinder and the shell including collector plates and electrode wires, means for supplying current to the wires, means for rapping the plates and the wires to discharge material collected thereon, an air inlet pipe extending centrally down through the drum and cylinder and terminating above the bottom thereof, a plurality of baffle plates between the air pipe and the cylinder having openings therethrough and forming a tortuous passageway for air passing upwardly through the cylinder, an air chamber at the top of the cylinder for receiving air therefrom, and means for conducting resulting heated air from said chamber.

2. An apparatus, as in claim 1, having manually controllable means for diverting a portion of the incoming air to the upper portion of said cylinder whereby to cool the upper ends of the tubes and means conducting such air from said cylinder.

3. An apparatus, as in claim 1, further characterized in that the annular shaped electric precipitator chamber is divided into a plurality of sections, lower gas inlet means extending below said sections and below the lower end of said cylinder for conducting gases of combustion to the sections, valving means between said sections and said annular gas chamber for shutting off the gases at times from the respective sections, and means connecting to the side of said shell for automatically rapping the collector plates in said sections.

4. The apparatus of claim 1 further characterized in that said electric precipitator has the annular gas receiving chamber divided into a plurality of sections, an inlet gate for each section, means for automatically actuating said gates for opening and closing the same at predetermined times, vertically arranged collecting plates mounted in said sections, electrode wires positioned adjacent to the plates, means for rapping the plates and the wires whereby the plates and wires of one section will be rapped when the gas is cut off therefrom, said sections being opened and closed serially around the chamber, and the rapping of the respective sections being performed while the successive sections are closed.

5. The apparatus of claim 4 further characterized in that in combination with the collecting plates of said electric precipitator, there is a carriage mounted adjacent to the precipitator, rapping devices mounted on the carriage and adapted to coact with the precipitator, means for moving the carriage, and means for actuating the rapping device.

6. A unitary heat exchange and particle cooling apparatus suitable for cooling and purifying the combustion gases from a cupola, which comprises in combination, a closed gas distributing drum having connected therewith a gas inlet duct, a cap member extending across the top of the drum, a header plate extending across the lower portion of said drum, a plurality of hot gas tubes extending downwardly from said plate, a second header plate in which the lower ends of the tubes are fastened, a cylinder extending from the first said header around said tubes and extending below the lower ends thereof, with said second header forming a partition in the cylinder, a shell around the cylinder forming an annular space therebetween, a discharge hopper connecting to the lower end of said shell, a material outlet from the lower portion of said hopper, an annular gas chamber around the top of said shell suitable for receiving gas passing upwardly through said annular space, an outlet from said gas chamber, electrical precipitator means positioned in said annular space between the cylinder and the shell, said precipitator means including collector plates and electrode wires, means of supplying current to said wires, means for rapping said plates and said wires to dislodge material collected thereon, air inlet means connecting with the interior of said cylinder and the space around said hot gas tubes, and means for conducting resulted heated air from the interior of said cylinder.

REGNER A. EKSTROM, Jr.

References Cited in the file of this patent
UNITED STATES PATENTS

| Number | Name | Date |
|---|---|---|
| 1,185,136 | Seaman | May 30, 1916 |
| 1,574,422 | Feind | Feb. 23, 1926 |
| 1,728,130 | Mathesius et al. | Sept. 10, 1929 |
| 1,740,886 | Barr et al. | Dec. 24, 1929 |
| 1,820,734 | Feldman | Aug. 25, 1931 |
| 1,884,048 | McCloskey | Oct. 25, 1932 |
| 2,014,298 | Schneible | Sept. 10, 1935 |
| 2,065,563 | Carter et al. | Dec. 29, 1936 |
| 2,345,502 | Reece | Mar. 28, 1944 |
| 2,411,097 | Kopp | Nov. 12, 1946 |
| 2,468,903 | Villiger | May 3, 1949 |